2,907,719

POLYURETHANE OF A POLYISOCYANATE, AN ACTIVE HYDROGEN COMPOUND AND A HYDROXYARYL - ALIPHATIC ACID - ALDEHYDE CONDENSATE AND METHOD OF PREPARING SAME

Sylvan O. Greenlee, Racine, Wis., assignor to
S. C. Johnson & Son, Inc., Racine, Wis.

No Drawing. Application February 21, 1957
Serial No. 641,454

9 Claims. (Cl. 260—2.5)

This invention relates to novel resinous compositions of matter of the polyurethane type and is directed more particularly to synthetic resinous compositions derived from the reaction of hydroxyaryl-aliphatic acid-aldehyde condensation products with polyisocyanates in presence of an organic compound capable of entering into the reaction and exerting an influence upon the nature of the resulting product.

It is known a urethane resin may be obtained by reacting a polyisocyanate or polyisothiocyanate with a group of compounds characterized by one or more of what has been termed "an active hydrogen group." Foremost among the "active hydrogen" compounds, at least as regards commercial development, have been the polyester compounds, although polyhydroxy-, polyamino-, polyamide- and polythio-compounds are also recognized as being more or less useful in this connection. The resinous products derived from this reaction are dependent for their characteristics, for the most part, upon the structure of the active hydrogen compound with the isocyanate acting principally as a physical coupling agent between residues of the polyester or other compound. The range or variety of properties has thus been limited by the types of structures possessed by available active hydrogen compounds, and the formulator has often found it quite difficult to develop products having the desired characteristics.

The primary object of the present invention is the incorporation in a polyurethane-forming mixture of a compound having multiple functionality both with respect to isocyanates and isothiocyanates and active hydrogen compounds, by means of which compound a broad spectrum of polymers of this type can be obtained.

Another of the objects of this invention is to provide a new class of synthetic resinous compositions which are capable of further reaction to give infusible, insoluble materials suitable for use as protective coatings, adhesives, and molding resins having a variety of properties.

A further object is the synthesis along the general lines of established urethane reactions of a film-forming product characterized, by virtue of the novel reactants from which it is derived, with improved properties especially as regards resistance to attack by common chemicals, resistance to wear or damage, and resistance to penetration and solvent action by water.

By suitable adjustment of the conditions of the reaction and the ingredients, the product of the invention may be caused to assume a cellular or foam state, and accordingly, an additional aim of the invention is the provision of light-weight three-dimensional solids possessing good structural strength and, therefore, useful in load-bearing applications.

These and other objects are accomplished by the present invention which contemplates the reaction of a substantial amount of an isocyanate or isothiocyanate, at least half of which must contain two or more isocyanate or isothiocyanate groups per molecule; the condensate of an aldehyde with an aliphatic acid, having a total of at least five carbon atoms with a single carbon atom being substituted with two hydroxyaryl groups; and an organic compound having as active hydrogen groups at least two of the following radicals, which two may be the same or different: YH, CYYH, $NH_2$, and $CYNH_2$, where Y is oxygen or sulfur, which compound is free of interfering reactive groups.

It has been found that the addition of hydroxyaryl aliphatic acid-aldehyde condensates to a polyisocyanate-active hydrogen compound reaction mixture is an unusually advantageous measure for obtaining polymeric resinous compositions characterized by excellent protective coating and adhesive properties when used as a film, and high structural strength when cast into foam resin bodies. These acid condensates are especially adapted for the reaction by virtue not only of the presence in each molecule thereof of a plurality of functional groups reactive with both the isocyanates and active hydrogen compounds, but because of the novel combination of hydroxyl and carboxyl radicals that make up this plurality of groups. As will be explained more fully, both hydroxyl and carboxyl radicals condense with an isocyanate group and, thus, may serve as reactive foci in the formation of a polymer; in addition, the carboxyl radical during the course of the condensation decomposes to liberate carbon dioxide which is of assistance in producing foam resin structures. Hydroxyaryl-aliphatic acid-aldehyde condensates useful herein are viscous or soft resinous compositions containing one or more residues of unique symmetrical structure and tend to contribute to the reaction product such properties as outstanding chemical resistance and superior hardness and toughness. Chemical resistance is, for example, of great value in the formulation of protective coatings which are likely to be subjected in the course of ordinary usage to contact with various chemicals. The presence in the resin of residues having a symmetrical structure results in a more rigid product, a feature of much advantage in polyurethane foams.

The hydroxyaryl-aliphatic acids used in the condensation may be, and preferably are, prepared by condensing a phenolic compound with a keto-acid under such conditions that two hydroxyaryl radicals are attached to the same carbon atom of the acid. In order for the yields of this reaction to achieve useful levels, it is necessary, first, that the keto-carbon atom occur at the position adjacent a terminal methyl group, and, second, that the keto-acid has a least five carbons in the aliphatic chain. The keto-acid of this type which has only four carbon atoms, acetoacetic acid, is highly unstable under the conditions necessary for the reaction and is unsatisfactory. The five-carbon acid, levulinic acid, gives excellent yields. Higher acids are apparently useful, but these exist principally as laboratory curiosities and are not available in commercial quantities. There is disclosed in prior copending applications, Serial Nos. 464,607 and 489,300, filed October 25, 1954, and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols, and shall for the sake of brevity, be referred to herein as "the Diphenolic Acid."

The term "substituted phenols" is used herein to embrace phenols, and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine, or combinations thereof, provided that a total number of substituents, including hydroxyl groups does not exceed three. The diphenolic acids derived from substituted phenols, such as the alkylated phenols, are sometimes more desirable than the products obtained from unsubstituted phenols since the alkyl groups tend to provide better organic solvent solubility, flexibility, and water-resistance, as well as influencing the nature and extent of subsequent reactions for which the acids are adapted. However, the unsubstituted product is usually more readily purified.

These hydroxyaryl-aliphatic acids react with an aldehyde, formaldehyde for example, to yield initially an alkylol condensation product. This may be illustrated by the following formula of the methylol condensation product of 1 mol of 4,4-bis(4-hydroxyphenyl)pentanoic acid (formed by the addition of phenol and levulinic acid) and 2 mols of formaldehyde:

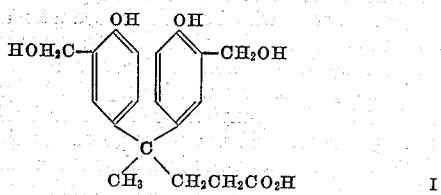

When phenolic compounds condense with aldehydes, the phenolic hydroxyl groups activate the aromatic nuclei at positions that are ortho and para with respect to the hydroxyl groups. The introduction of the aldehyde into the nuclei will, therefore, be at these positions, provided, of course, the carbon atoms there are coupled to hydrogen atoms. 4,4-bis(4-hydroxyphenyl)pentanoic acid has two hydrogenated carbon atoms in each of its two aromatic nuclei, so that up to 4 mols of aldehyde may be reacted readily with each mol of this acid to form an alkylol condensate. In the case of alkyl and halo-derivatives of the acid, i.e., where alkyl groups or halogen atoms have been substituted in the aromatic nuclei of the acid, if appreciable condensation is to take place, the substitution should not be so complete as to remove all hydrogen atoms from the carbon atoms at the ortho and para positions. Upon the application of heat, the methylol groups react further and yield a resinous polybasic hydroxyacid consisting of residues of the acid linked together by methylene radicals. In those cases where the alkylol form is prepared by the introduction of aldehyde at substantially all the free ortho and para positions of the acid, polymerization is accompanied by the splitting off of alkylol groups and the liberation of aldehyde. A typical polymerization reaction of the material of formula I might be illustrated as follows:

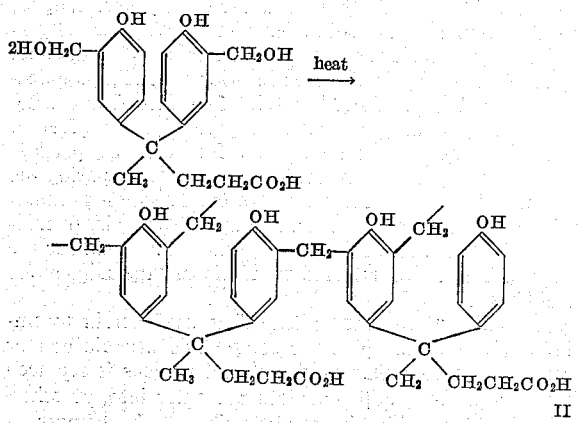

Somewhat different products may be obtained by using the bis-hydroxyaryl-aliphatic acids in combination with other mononuclear, polynuclear, monohydric, or polyhydric phenols. Such materials are exemplified by phenol, the cresols, the xylenols, butylphenol, the naphthols, and bis(4-hydroxyphenyl)isopropylidene. These phenolic compounds may be partially condensed with an aldehyde, and then admixed with a partially condensed mixture of Diphenolic Acid and aldehyde to yield further valuable complex condensation products. Alternatively, these phenols may be added to the initial reaction mixture of bis-hydroxyaryl-aliphatic acid and aldehyde to yield after condensation a slightly modified product. The phenol-aldehyde condensates contain carboxyl groups in addition to alkylol hydroxyl groups and phenolic hydroxyl groups. In the more highly condensed form, where most of the alkylol groups have been dehydrated to form methylene linkages, the compositions contain primarily phenolic hydroxyl groups and carboxyl groups. These phenol-aldehyde condensates and their preparation are more fully described in a copending Greenlee application Serial No. 534,405, filed September 14, 1955, entitled, "Phenolic Acid, Aldehyde Condensates."

For the purpose of condensing the Diphenolic Acid, any aldehyde can be employed that will condense with the particular hydroxyaryl substituent of the acid. Formaldehyde is universally satisfactory and is preferred. It may be in the form known as formalin, a 40% aqueous solution. Formaldehyde engendering compounds, such as para-formaldehyde, trioxymethylene, and hexamethylene tetramine are also particularly suitable.

The resinous Diphenolic Acid-aldehyde condensates may conveniently be used at any stage of condensation, thus providing one wishing to formulate infusible, insoluble products with a broad range of starting materials. The condensate may be the initial reaction product consisting primarily of alkylol Diphenolic Acid, i.e. an A-stage resin, in which case, it would be essentially a monomer containing one carboxylic acid groups, two phenolic hydroxyl groups, and one or more alcoholic hydroxyl groups per molecule. This initial aldehyde condensate may, on the other hand, be heated to couple the Diphenolic Acid nuclei and form, as a B-stage resin, a polybasic acid containing phenolic and alcoholic hydroxyl groups. All of these condensates will have substantially two phenolic hydroxyl groups for each carboxylic acid group, since so far as it can be determined the phenolic hydroxyl groups, as such, are little involved in the linking together of Diphenolic Acid molecules during condensation. The condensation must not, of course, be allowed to proceed to a point where the product is insoluble with the isocyanates with which it is to be reacted and certainly not to a C-stage resin that is insoluble and infusible. The extent of condensation should also be such as not to restrict the solubility of the product in solvents which might be used in applying a mixture of a Diphenolic Acid-aldehyde condensate and an isocyanate, as in the formation of a protective coating film.

The second component necessary for the reaction of the present invention is an isocyanate or isothiocyanate compound. In order that a resinous product be obtained, the isocyanate or isothiocyanate compound must contain two or more isocyanate or isothiocyanate groups, a plurality of functions being essential if a chain or cross-linked structure is to be developed by condensation with the functional groups of the condensate and/or the active hydrogen compound. Accordingly, the isocyanate may be defined as a compound having the general formula $R(NCX)_z$, where X is a chalcogen having an atomic weight less than 33, i.e., oxygen or sulfur; z is an integer of more than one; and R is a polyvalent organic radical with the number of valences being equal to z. There are numerous compounds coming within this formula that are suitable for the reaction and no attempt will be made to give an exhaustive list. The following are considered illustrative and will suggest to the expert a variety of others; alkylene diisocyanates; such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4, 4'-diisocyanate, and their corresponding sulfur analogues; aliphatic-aromatic diisocyanates, such as xylene-1,4-diisocyanate, diphenylene methane diisocyanate and their corresponding sulfur analogues; hetero-diiso- and diisothiocyanates, such as $SCNCH_2OCH_2NCS$ and $SCNCH_2SCH_2NCS$; and isocyanates ad isothiocyanates having more than two isocyanate or isothiocyanate groups, such as benzene 1,2,4-triisocyanate, 1,2,2-triisocyanatobutane, and toluene triisocyanate. From among these and other polyisocyanates and polyisothiocyanates, the following are preferred largely by reason of their ready commercial availability: toluene 2,4-diisocyanate, toluene 2,6-diisocyanate, methylene bis-(4-phenyl isocyanate), 3,3' bitolylene 4,4' diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, urethane reaction requires a polyisocyanate compound, it is desirable for certain applications to alter the product by using, in addition, a minor portion of a monoisocyanate. Some of the reaction products of diphenolic acids with polyisocyanates tend to be brittle infusible products; on the other hand, this tendency may be frequently counteracted by the addition to the reaction mixture of a proper amount and type of monoisocyanate, particularly when combined with the proper amount and type of active hydrogen compound. Examples of suitable monoisocyanates are octadecylisocyanate and hexyl isocyanate, to mention just a few of the simpler compounds. Long-chain monoisocyanates, i.e., having more than 11 carbon atoms, are more effective as regards flexibility. Unsaturated compounds can also be utilized and provide an additional curing or converting aid. The amount of the mono-compound that is added to the reaction mixture will vary depending upon the characteristics desired in the product. As a general rule, there should be present a greater amount of the poly-compound than the mono-compound, which is to say, that the monoisocyanate should be less than 50% of the total of all isocyanates in the reaction mixture. If a more rigid, brittle material is sought, the quantity of the mono-form should be decreased while, if more flexibility is the desideratum, it should be increased toward the upper limit just mentioned. The functional group of the mono-form may react with the carboxyl or phenolic hydroxyl groups of the acid to reduce cross-linking between adjacent molecules of the polymer and thereby enhance the softness and pliability of the polymer in proportion to the amount present, or a functional group of one or more molecules of the monoisocyanate may react with the methylol groups of the condensate and, thus, preclude further growth of the chain. Reaction of the mono-compound and the active hydrogen compound is also a possibility, which reaction may also end the growth of the polymer molecule or reduce cross-linking.

The active hydrogen compound is the final component of the reaction mixture described herein. For the purpose of the invention, the active hydrogen compound must satisfy two requirements: First, it must include at least two of the radicals —OH, —COOH, —CONH$_2$, —NH$_2$, —SH, —COSH, CSOH, CSSH and CSNH$_2$, which two may be the same or different radicals; and, second, it must be free of interfering reactive groups. To simplify the discussion, compounds meeting these requirements have been grouped into the following classes: (A) the polyhydroxy compounds, (B) the polybasic acids, (C) the polyamines and polyamides, (D) miscellaneous analogous sulfur compounds, and (E) the polyester resins. As will be seen later, compounds containing more than one type of radical, i.e., "hybrid" compounds, have not been classified independently but are included in these five groups. In this case, as a rule, the compound is classified in that group, of the several into which it might fall by virtue of the radicals it contains, which has the highest numerical designation in accordance with the above break-down. For example, a compound containing both hydroxy and amine radicals appears with the polyamines and polyamides, a compound containing both hydroxy and mercapto radicals appears with the sulfur compounds, and a compound having recurring ester linkages and free carboxyl radicals appears with the polyesters.

The first of these classes are the polyhydroxy compounds, which, as contemplated herein, embraces the aliphatic, alicyclic, heterocyclic, and aromatic compounds containing at least two hydroxy radicals. Examples of these compounds are the alkylene glycols, such as ethylene glycol; polyalkylene glycols, such as diethylene glycol and the "Carbowax" series manufactured and sold by the Carbide and Carbon Chemical Company; glycerol, erythritols, higher alcohols, such as mannitol and sorbitol; aromatic alcohols, such as resorcinol, hydroquinone, and bis-phenol; and resinous alcohols, such as the epoxides. Mixtures of the Diphenolic Acid with dihydric phenols, particularly the alkylidene diphenols, in reaction with the isocyanates give rigid, infusible products possessing excellent chemical resistance to alkali and water when formed as films and outstanding rigidity when cast as foam resin structures. It is well known that the polyhydric alcohols, such as the long-chain glycols, give on reaction with the isocyanates soft flexible-type compositions of relatively low chemical resistance. Modification of these compositions with Diphenolic Acid-aldehyde condensates has been found to greatly increase the chemical resistance of protective coating films prepared therefrom as well as to strikingly heighten the rigidity of foam resin structures produced therefrom.

Next in the classification are the polybasic acids. Examples of these acids are the saturated aliphatic polycarboxylic acids such as adipic acid, tricarballylic acid and azelaic acid; unsaturated aliphatic polycarboxylic acids, such as fumaric acid and aconitic acid, and aromatic polybasic acids, such as the isomers of benzene dicarboxylic acid. Polyfunctional acids are of particular interest in connection with the formation of resin foams as the carboxyl group decomposes upon reaction with an isocyanate to release carbon dioxide. With the addition of a Diphenolic Acid condensate, further carbon dioxide is available from the carboxyl group of the condensate and enhanced foaming results. This is advantageous since enhanced foaming was previously obtained by adding substantial amounts of water. As is well known, water reacts with an isocyanate to yield carbon dioxide and a carbamide. In addition, the acid condensate serves to strengthen the rigidity of the foam and causes the cell arrangement to be disconnected or closed rather than open. Where the combination of isocyanate, polybasic acid and condensate is used as a film or coating, the last tends to balance the essentially soft influence of the polybasic acid, permitting the formulation of tougher, harder films than would otherwise be the case. One interesting property of the polybasic acids in this association is their tendency to improve the water characteristics of the film, presumably due to the hydrophilic character of such acids. Films which are highly hydrophobic are whitened by prolonged contact with water. By adding material having hydrophilic properties to the film-forming mixture, the hydrophobic character of the film can be reduced to a level at which whitening does not occur but without undue loss of overall resistance to water.

The third class, the polyamines and polyamides, is characterized by the presence of an —NH₂ radical, which in the case of the polyamides is combined with a carbonyl group as the radical —CONH₂. Examples of this class are the alkylene and polyalkylene diamines, such as ethylene diamine and hexamethylene diamine; heterocyclic polyamines, such as diethylene diamine and triethylene diamine; and aromatic polyamines, such as phenylene diamine; the alkane diamides, such as malonamide, succinamide and adipamide; aromatic diamides, such as phthaldiamide; and the resinous polyamides. Compounds containing at least two amino radicals are of particular value in accelerating the reaction. It is interesting to observe that polyamines are inclined to impart flexibility to products while polyamides are disposed to impart rigidity. Thus, a product of balanced flexibility-rigidity, or increased rigidity, may be obtained by the addition of a Diphenolic Acid condensate. The poly-nitrogen compounds are also useful where products having high chemical and water resistance are sought.

Another class of active hydrogen compounds is the sulfur-containing chemicals. As a general rule, this class embraces the corresponding sulfur analogues of the members of the other classes. Thus, polythiols, such as ethanedithiol and propane-trithiol, polythioacids, polythioamides, and resinous polythio-compounds are included, among others. The most useful of these compounds for this invention are the thioresins sold under the trade name "Thiokol" and prepared by reacting an alkaline polysulfide with an organic dihalide, trihalide, or mixtures of the two. These polymers are thought to have thiol terminal groups. Preferably, the liquid polymers are employed because of their relatively low molecular weight, ease in handling, and ease in admixing with other reactants. As is well known, these materials undergo reaction with various coupling agents or can be cured with numerous curing agents to form rubbery polymers which are usually soft and flexible. When compounded with a Diphenolic Acid condensate and an isocyanate, thio-resins yield smooth, tough, flexible products having much augmented chemical resistance. Other sulfur compounds, such as the simple mercapto acids and mono- and dimercaptans, may be used in conjunction with these condensates in the formulation of valuable coating, adhesive, and molded objects.

Finally, there are the polyester resins, which are polymers, having recurring ester linkages and unreacted hydroxyl and carboxyl terminal groups, formed by reacting a polybasic acid with a polyhydric alcohol. The nature of the reactive groups is determined by the proportion of the reactants. Thus, an excess of the alcohol favors terminal hydroxyl groups while an excess of acid favors terminal carboxyl groups. By properly balancing the amounts of each, terminal groups of both kinds can be procured. There are a number of polyester compounds available commercially, one example being a series having hydroxyl values ranging from 70–1000 and acid numbers ranging from 0–80 sold under the trade name "Multron" by the Mobay Chemical Company. Among the polybasic acids that can be used are succinic, adipic, maleic, sebacic, azelaic, fumaric, and dimerized acids, such as dimer fatty acids prepared and sold by Emery Industries, Inc. Suitable polyhydric alcohols include ethylene glycol, diethylene glycol, triethylene glycol, pentaerythritol, dipentaerythritol, tripentaerythritol, sorbital, mannitol, glycerine, trimethanol propane and triethanol propane.

It is well known that reaction of polyester resins with the polyisocyanates results in soft flexible foam resin structures and soft coating compositions and molding materials. The use of Diphenolic Acid-aldehyde condensates in conjunction with these polyesters and isocyanates has been found to be an excellent mode of promoting rigidity in foam resin structures of this type. Thus, moderately to completely stiff three-dimensional articles can be easily obtained merely by incorporation of the condensate in selectively increased amounts. Variation in density of the solid product may also be effected by this means. In the field of protective coatings and adhesives, an analogous hardening and toughening influence by the Diphenolic Acid condensate exists so that products of this kind display substantially enhanced resistance to chemical attack and deterioration as well as general wear and tear without necessarily involving undue sacrifice of the natural flexibility and clarity of the polyester resins.

The general chemistry of the present reaction is basically simple. It is well known that isocyanates react with the various chemical functional groups of the compounds employed herein and these reactions may be illustrated as follows:

(1) Hydroxyl group:

$$ROH + R'NCO \rightarrow R'NHCOOR$$

(2) Carboxyl group:

$$RCOOH + R'NCO \rightarrow R'NHCOOCOR \rightarrow R'NHCOR + CO_2$$

(3) Primary amino group:

$$RNH_2 + R'NCO \rightarrow R'NHCONHR$$

(4) Amide group:

$$ROONH_2 + R'NCO \rightarrow R'NHCONHCOR$$

The same reactions take place where sulfur is substituted for any oxygen in these reactants.

In the present invention, it is postulated that the reaction occurs within a system of three or more components, each of which is characterized by at least double functionality. Accordingly, while the union of any two groups will proceed as set forth above, it will be appreciated that the resultant product will in any case be polymeric. Further, it will be apparent that the possible arrangements that may be taken within the polymer molecule by the residues of the reactants are entirely too numerous to be illustrated herein. Due to the high reactivity of isocyanate groups, one would expect the condensation between these groups and the functional groups of the Diphenolic Acid condensate to take precedence over any possible reaction between the condensate and the active hydrogen compound. Thus, it can be predicted that the polymer molecule comprises residues of the condensate linked together by isocyanate residues alone or which are themselves coupled by means of the residues of the active hydrogen compound. Where the isocyanate and active hydrogen compound are difunctional, the condensate residues would be separated by essentially linear chains with cross-linking taking place between the residues in adjacent chains due to the excess functionality of the Diphenolic Acid condensates. With isocyanates and/or active hydrogen compounds having more than two functions, cross-linking to a much greater degree would ensue.

The diversity of the isocyanates and active hydrogen compounds that can be employed makes it virtually impossible to prescribe a fixed set of rules governing the choice of a class of compounds, the particular member of that class, as well as the amounts of the member. Some of the classes and their individual members are more or less equally suited for use in producing a given product so that a choice depends in many instances upon the personal preference of the formulator, such preference being based, for example, on his greater experience in working with certain types of materials than with others. As a rule, aliphatic compounds favor flexibility and softness with the extent of these properties increasing with the chain length. Conversely, compounds having a tightly knit or cyclic molecular structure favor rigidity and hardness. As a consequence, a wide range of properties can be developed by the careful selection of reactants: that is, all may promote flexibility, all may promote rigidity, or some one and some the other in order to cover the gamut between the two extremes.

Along with the specific reactants, the properties of the product are also influenced by the amount of each reactant that is employed. Because of the high reactivity of the isocyanate, for the purpose of defining proportions it may be considered that the Diphenolic Acid-aldehyde condensate and active hydrogen compound react as a "unit" with the isocyanate. Within this suppositious "unit," the active hydrogen compound may constitute from about 5 to about 65% of the whole, determined on the basis of equivalent weight, with the condensate making up the rest. Below 5%, the effects of the active hydrogen compound are rarely significant, while above 65%, the contribution of the condensate is counteracted excessively or is not sufficiently great to be of real value. Experience has indicated that the Diphenolic Acid condensate and active hydrogen compound, considered together, may be reacted in amounts, again calculated on an equivalent basis, varying from about one-fifth of the isocyanate up to about five times the isocyanate. Some products prepared from amounts outside this range may display useful characteristics attributable to all three of the reactants, but this appears to be the exception rather than the rule, and, for the most part, valuable products fall within this range. From a consideration of the reaction, it will be appreciated that the optimum situation usually prevails where all of the functional groups of condensate and active hydrogen compound are reacted with functional groups of the polyisocyanate. For this reason, a preferred range is 2:1 to 1:2 of condensate and active hydrogen compound to isocyanate on an equivalent basis with a 1:1 ratio being most desired.

If a monoisocyanate is employed along with the polyisocyanate, the number of reactive foci of the Diphenolic Acid condensate and active hydrogen compound available to the functional groups of the polyisocyanate is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films or molding compositions are prepared in accordance with the present invention involves merely adding at ordinary temperatures the Diphenolic Acid-aldehyde condensate and active hydrogen compound to the isocyanate, admixing and converting the mixture by exposure either to normal temperatures or to heat. In some cases, it is desirable to dilute some or all of the reactants, e.g., in order to lower the viscosity of the mixture and, thus, vary the film thickness of a single coat, and/or in order to dissolve the condensate, where necessary at room temperature. Any solvent that is inert to both the condensate and isocyanate may be used, an example being methyl ethyl ketone among many others. The mixture of reactants, either diluted or not, has been found to be reasonably stable for moderate periods at normal temperatures. Such stability is a feature of some importance as it permits large quantities of the mixture to be made up at one time and then used as needed. For heat cure, temperatures of about 85-225° C. for times of about one hour to about five minutes have been found satisfactory. For a normal temperature cure, it is preferred that any of the well known conversion catalysts for reactions of this type, such as triethanolamine, be added in small amounts in order to reduce the amount of time needed for the film to harden. When early conversion is of no special advantage, the catalyst may be dispensed with. As the examples show, the characteristics of the cured films vary with the particular combination of reactant and amounts that are employed, with some being better than others, as would ordinarily be expected. As a whole, however, the films possess characteristics that compare favorably with many other available materials so that the product of the invention is quite useful for a variety of purposes. For example, in numerous instances, the films of this invention have withstood boiling water for 16 hours and a 5% caustic solution for more than 50 hours without any indication of failure.

Where solid foam or cellular structures are desired, they may be obtained by mixing the concentrated Diphenolic Acid condensate and active hydrogen compound with a suitable conversion catalyst, of which triethanolamine is again an example, in an appropriate reaction vessel at temperatures at or above the melting point of the condensate, where it is solid at room temperature, adding the isocyanate while agitating, pouring the mixture into a mold, allowing the mixture to foam unimpeded, and converting by heating, as in a draft oven, at a temperature of about 85-150° C. or more for from about 5-30 minutes, or by normal temperatures for much longer periods. Although not essential, it is usually desirable to employ an emulsifier in order to obtain a more homogeneous mixture of the reactants. The reaction usually proceeds instantaneously at these temperatures. The instant process may be carried out readily in any system which provides for stirring and has sufficient space for the foaming action to proceed unhindered. A modification of a unit currently used in commercial urethane foam production may be employed. Such a system comprises two supply tanks connected to a pressure-mixing nozzle by suitable feed lines. One tank contains the isocyanate and the other tank, which may have to be heated, contains the Diphenolic Acid condensate and active hydrogen compound emulsified with the emulsifying agent and catalyst. The condensate and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured by exposure to normal temperatures as in the case of the films, this considerably prolongs the curing time and a heat cure is preferred.

As has already been briefly mentioned, the Diphenolic Acid condensate as well as carboxyl-containing active hydrogen compounds are especially well suited for the formation of urethane foams by reason of the carboxyl group or groups which they contain. These groups in the course of the reaction decompose to form gaseous carbon dioxide which bubbles through the mixture to produce a cellular structure. Thus, a foaming medium is inherently present, eliminating the need, in many instances, of an external foaming agent, this being especially true where a polybasic acid constitutes the active hydrogen compound. With other active hydrogen compounds, it occasionally proves advantageous to add small amounts of water, say up to about 5% by weight of the mixture, to assist in the foaming action. The use of water merely as an assistant does not add unduly to the curing time of one hour or less which is in distinct contrast to typical present commercial polyurethane foam processes, wherein water is relied upon as the sole or principal foaming agent, which require a post-cure of some 24 hours' duration. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity contributed by the Diphenolic Acid-aldehyde condensates are especially significant in the case of foam structures since such structures made in the past from isocyanate and active hydrogen compound reaction mixtures have, for the most part, been of rather soft, spongy texture. The toughness and rigidity together with the resistance to water and common chemicals that the present foams exhibit as well as a very low density when compounded to this end, constitute a rather exceptional combination in this field, so that the present invention should be particularly valuable in producing foam structures for such uses as insulation, crash linings for vehicles, aircraft, etc., and structural components alone or in conjunction with outer coverings of wood or metal.

For the sake of brevity as well as convenience, most of the remainder of this disclosure will be presented in the form of four tables, the first three giving examples of the three reaction components, along with some pertinent information concerning them, and the fourth providing working examples of the invention in the coating field.

The acid condensates mentioned in Table I were all prepared in accordance with the following procedure. A mixture of 3 mols of the specified monohydric phenol, 1 mol of levulinic acid, and 250 parts of 37% aqueous hydrochloric acid was agitated at 50° C. for 72 hours. The upper organic layer was removed from the aqueous HCl by decantation. The product was then subjected to vacuum distillation, using a water aspirator, at a pressure of 15 to 30 mm. with the application of heat until the temperature had reached 165–170° C., thereby removing volatile materials including any unreacted HCl, water, and major portion of unreacted phenol and some of the unreacted levulinic acid. Vacuum distillation was continued using a vacuum pump system which reduced the pressure down to 1 mm. of mercury, while the reaction temperature was gradually raised to 200° C., heating in the range of 170–200° C. for a period of around 45 minutes.

Table I.—Representative Diphenolic Acid-aldehyde condensate

| No. | Condensate | Abbreviation | Isocyanate equivalent (observed) |
|---|---|---|---|
| 1 | Condensation of alkyl diphenolic acid and formaldehyde with alkaline catalyst: A mixture of 314 parts of the Diphenolic Acid obtained from ortho-cresol and levulinic acid and having an acid value of 139 and a saponification value of 192, 172 parts of formalin (38% aqueous formaldehyde), and 15 parts of sodium hydroxide as a 10% aqueous solution was placed in a 3-necked reaction flask provided with a mechanical stirrer, a reflux condenser, and a thermometer. With continuous agitation the temperature was gradually raised to 100° C. and held at this temperature for 1 hour and 20 minutes. The water was then removed by vacuum distillation at a pressure of 20–30 mm. using a water aspirator pump, the charge being heated to 96° C. during the distillation. The residual aldehyde condensate amounted to 360 parts. | AC1 | 52.6 |
| 2 | Condensation of DPA [1] and formaldehyde with alkaline catalyst: A mixture of 286 parts of Diphenolic Acid from 3 mols of phenol and 1 mol of levulinic acid, having an acid value of 141 and a saponification value of 201, 258 parts of formalin, and 15 parts of 10% aqueous sodium hydroxide was heated with continuous agitation as in No. 1 at a temperature of 100° C. for 1 hour. The water was removed by vacuum distillation at a pressure of 20–30 mm. with the temperature rising to 92° C. during the final distillation. The residual aldehyde condensate amount to 352 parts. | AC2 | 50.2 |
| 3 | Condensation of excess DAP and formaldehyde: A mixture of 626 parts of the Diphenolic Acid obtained from 3 mols of phenol and 1 mol of levulinic acid, having an acid value of 153 and a saponification value of 204, and 350 parts of formalin was heated at 100° C. with continuous agitation for a period of 1 hour and 30 minutes. The water was removed by distillation at a pressure of 20–30 mm. using an aspirator pump. The residual aldehyde condensate amounted to 732 parts. | AC3 | 133.2 |

Table I.—Representative Diphenolic Acid-aldehyde condensate—Continued

| No. | Condensate | Abbreviation | Isocyanate equivalent (observed) |
|---|---|---|---|
| 4 | Condensation of DPA, bis-phenol and formaldehyde with acid catalyst: A mixture of 429 parts of a Diphenolic Acid obtained from 3 mols of phenol and 1 mol levulinic acid, having an acid value of 152 and a saponification value of 208, 342 parts of bis(4-hydroxyphenyl)dimethyl methane, 480 parts of formalin, and 1.92 parts of oxalic acid was heated at 100° C. for a period of 1 hour and 10 minutes, with continuous agitation. The water layer was removed by decantation and the organic resin layer washed 3 times with hot water. The organic resin layer was then freed from the last traces of water by vacuum distillation at a pressure of 20–30 mm., using a water aspirator pump, and a temperature of 84° C. The resulting product amounted to 912 parts. | AC4 | 123.9 |
| 5 | Condensation of alkyl diphenolic acid and formaldehyde with acid catalyst: A mixture of 157 parts of the Diphenolic Acid used in No. 1, 86 parts of formalin, and 0.35 part of oxalic acid was heated with continuous agitation at 100° C. for 1 hour. The water layer was removed by decantation and the phenolic resin layer washed 3 times with hot water. The residual resin layer was dried by vacuum distillation at a pressure of 20–30 mm., using a water aspirator pump, with the temperature rising to 100° C. The product amounted to 176 parts. | AC5 | 112 |
| 6 | Condensation of alkyl diphenolic acid and formaldehyde with acid catalyst: A mixture of 157 parts of a Diphenolic Acid obtained by the reaction of 3 mols of meta-cresol with levulinic acid, having an acid value of 165, 86 parts of formalin, and 0.35 part of oxalic acid was heated at 100° C. with continuous agitation for a period of 1 hour. The water layer was removed by decantation and tha phenolic resin layer washed 3 times with hot water. The residual resin layer was finally dried by vacuum distillation at a pressure of 20–30 mm., using a water aspirator pump, while heating to 93° C. The product amounted to 164 parts. | AC6 | 191 |

[1] DPA is a trademark for 4,4-bis(4-hydroxyphenyl)pentanoic acid.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanate by reaction with di-n-butylamine. Specifically, the technique used is as follows:

To 25 ml. of methyl isobutylketone is added 3 grams of toluene - 2,4 - diisocyanate previously standardized against di-n-butylamine and a weight of the acid such that diisocyanate is present in approximately 100% excess. To this mixture is added triethylamine in an amount equal to 1% of the total weight of isocyanate and the acid. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed up to the boiling point, allowed to stand for one hour at which point 75 ml. of methanol is added, and the excess di-n-butylamine back-titrated with 1 N alcoholic hydrochloric acid. By carrying out the preparation of the acids with great care, values at or approaching the theoretical can be achieved.

The acid number given for each acid has its usual meaning, which is the number of milligrams of potassium hydroxide necessary to neutralize the acid content of 1 gram of the sample, and provides an indication of the degree of acidity of the product.

*Table II.—Representative isocyanates*

| Commercial source, trade name, and abbreviation | Structure | Amine equivalent | |
|---|---|---|---|
| | | Observed | Theory |
| E. I. du Pont de Nemours & Co., Inc. | 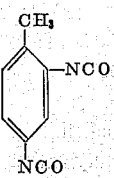<br>Toluene-2,4-diisocyanate | 90.62 | 87.07 |
| E. I. du Pont de Nemours & Co., Inc.; Hylene M; Hy M | 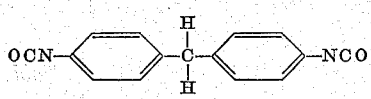<br>Methylene bis(4-phenyl isocyanate) | 139.98 | 125.12 |
| National Aniline Div.; Nacconate 200; N 200 | 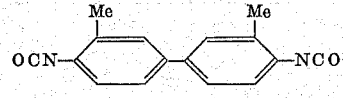<br>3,3′-bitolylene-4,4′-diisocyanate | 132.78 | 132.13 |
| Mobay Chemical Co.; Mondur N5; MO N5 | 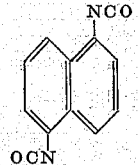<br>Naphthylene-1,5-diisocyanate | 116.58 | 105.09 |
| Mobay Chemical Co.; Mondur TM; MO TM | 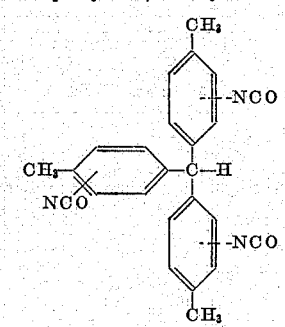<br>Tritolylmethane triisocyanate | 107.78 | 123.45 |
| Mobay Chemical Co.; Mondur HX; MO HX | OCN(CH$_2$)$_6$NCO<br>Hexamethylene diisocyanate | 103.39 | 84.01 |
| Mobay Chemical Co.; Mondur P; MO P | 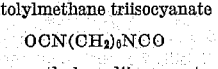<br>Phenyl isocyanate | Approx. 119 | 119 |
| Mobay Chemical Co.; Mondur NP; MO NP | 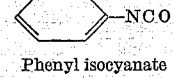<br>Naphthyl isocyanate | Approx. 169 | 169 |
| Shell Development Co.; Durenediisocyanate; Dur | 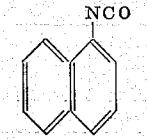<br>2,3,5,6-tetramethyl-1,4-benzene diisocyanate | 111.22 | 108.12 |

It will be noted that an observed and theoretical amine equivalent is specified for each isocyanate. The amine equivalent refers to the weight of the isocyanate containing one isocyanate group and reacting with one mole of di-n-butylamine. Since the isocyanates available commercially are not necessarily chemically pure, the observed values were obtained for use as a guide in formulating reaction products therefrom, as these values provide a measure of the actual purity of each compound.

The analytical procedure used to determine amine equivalents of diisocyanates is found in Monsanto Chemical Company's Technical Bulletin #P-125 and is generally as follows:

Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

*Table III.—Active hydrogen compounds*

A. POLYHYDROXY COMPOUNDS

| Compound | Abbrev. used in tables | Isocyanate equivalent | |
|---|---|---|---|
| | | Observed | Theoretical |
| Ethylene glycol | EG | 27.64 | 31.03 |
| 1,4-butanediol | Budiol | 39.26 | 45.06 |
| Diethylene glycol | DEG | 44.76 | 51.16 |
| Polyethylene glycol 400 (Carbide & Carbon Chemicals Co., described as having M.W. 380-420; viscosity 7.3 centistokes at 210° F.) | PG 400 | 163.48 | 190-210 |
| Polyethylene glycol 1000 (Carbide & Carbon Chemicals Co., M.W. 950-1,050; viscosity 17.4 centistokes at 210° F.) | PG 1000 | 409.76 | 500 |
| Polyethylene glycol 4000 (Carbide & Carbon Chemicals Co., M.W. 3,000-3,700; viscosity 75-78 centistokes at 210° F.) | PG 4000 | 1,851.9 | 1,500-1,850 |
| Polyethylene glycol 6000 (Carbide & Carbon Chemicals Co., M.W. 6,000-7,500; viscosity 700-900 centistokes at 210° F.) | PG 6000 | 3,475.6 | 3,000-3,750 |
| Glycerol (C.P. grade) | G | 29.53 | 30.67 |
| Pentaerythritol | PN | 24.24 | 34.04 |
| Epon 864 [1] (Shell Chemical Corp. An epoxy resin prepared from the condensation of epichlorohydrin with bis(4-hydroxyphenyl)-dimethyl methane in the presence of alkali having a melting point (Durrans' Mercury Method, Journal of Oil & Colour Chemists' Assoc. 12, 173-175 [1929]) of 40-45° C.; epoxide equivalent 300-375.) | Epon 864 | 311.63 | |
| Epon 1007 [1] (Shell Chemical Corp. An epoxy resin prepared from the condensation of epichlorohydrin with bis(4-hydroxyphenyl)-dimethyl methane in the presence of alkali having a melting point (Durrans' Mercury Method) of 127-133° C.; epoxide equivalent 1,550-2,000.) | Epon 1007 | 360.29 | |
| Bis(4-hydroxyphenyl)-dimethyl methane-formaldehyde condensate (In a 3 liter, 3-neck flask provided with a mechanical agitator, a thermometer, and a reflux condenser was placed 912 parts of bis(4-hydroxyphenyl)-dimethyl methane, 960 parts of 37% aqueous formaldehyde and 2.3 parts oxalic acid. With continuous agitation the reaction mixture was heated to reflux temperature and refluxing continued for 1 hr. After permitting the reaction mixture to cool to around 50° C. the water layer was removed by decantation. The phenol-formaldehyde layer was then washed 3 times with water which in each case was removed by decantation. The last portion of water was removed by distillation at reduced pressure using a water aspirator system which gave pressure around 30-40 mm. The flask temp. during the removal of this last portion of water ranged from 70-90° C. The product, amounting to 1,065 parts, was a clear, heavy, syrupy material. The non-volatile content was 83.4%.) | BDF | 98.78 | |
| p-t-Butylphenol-formaldehyde condensate (The procedure of preparation, including the dehydration step, was the same as that used with bis(4-hydroxyphenyl)-dimethyl methane above. A mixture of 1,000 parts of para-tertiary butylphenol, 1,067 parts of 37% aqueous formaldehyde, and 10 parts of sodium hydroxide was used to give a final yield of 1,470 parts of a clear, almost colorless syrupy product. The nonvolatile content was 93.6%.) | BPF | 156.54 | |
| Resorcinol | R | 105.38 | 55.05 |
| Hydroquinone, C.P. | HQ | 161.44 | 55.05 |
| 1,5-dihydroxynaphthalene | DHN | 217.38 | 80.08 |
| 4,4'-dihydroxybenzophenone | DHB | 221.0 | 107.1 |
| Bis(4-hydroxyphenyl)-dimethyl methane | BDM | 304.22 | 114.0 |

B. POLYBASIC ACIDS

| Compound | Abbrev. | Observed | Theoretical |
|---|---|---|---|
| Azelaic acid | Az | 87.53 | 94.11 |
| Adipic acid | AA | 71.35 | 73.07 |
| Aconitic acid | AcA | 57.28 | 58.03 |
| Fumaric acid | FA | 52.36 | 58.03 |
| Diglycolic acid | DGA | 166.02 | 67.04 |
| Isophthalic acid | IA | 485.29 | 83.06 |

[1] Preparation of these epoxide materials as well as illustrative examples are described in U.S. Patents 2,456,408, 2,503,726, 2,615,007, 2,615,008, 2,688,805, 2,688,807, and 2,698,315.

Table III.—Active hydrogen compounds—Continued

C. POLYAMINES AND POLYAMIDES

| Compound | Abbrev. used in tables | Isocyanate equivalent | |
|---|---|---|---|
| | | Observed | Theoretical |
| Hexamethylenediamine | Hexa | 31.96 | 29.05 |
| Diethylenetriamine | DET | 17.99 | 20.63 |
| Triethylene tetraamine | TT | 27.50 | 26.38 |
| Phenylene diamine | PD | 41.54 | 27.03 |
| Diethanolamine | DEA | 41.2 | 35.05 |
| Adipamide | ADA | 106.22 | 38.04 |
| Phthalamide | PA | 140.36 | 41.04 |
| Malonamide | MA | 63.65 | 25.52 |
| p-Toluenesulfonamide | TSA | 98.63 | 85.60 |
| Polyamide resin | PAR | 380.03 | 312.03 |
| (In a 3 liter, 3-neck flask provided with mechanical agitator, thermometer, and water trap with a reflux condenser above was placed 1,545 parts of Emery Industries, Inc., Dimer Acid #955 (a dimerized soya bean oil acid) and 269 parts of ethylenediamine. The flask was provided with an inlet for an inert gas. With continuous agitation and in an inert atmosphere of nitrogen gas the reaction mixture was heated from 94–220° C. over a period of 12 hours. 165 parts of water were removed from the reaction mixture during this period. The resulting polyamide resin had an acid number of 3.2, and a softening point of 87–89° C. (Durrans' Mercury Method).) | | | |

D. SULFUR-CONTAINING COMPOUNDS

| Compound | Abbrev. used in tables | Observed | Theoretical |
|---|---|---|---|
| Thiomalic acid | TA | 58.20 | 50.03 |
| Thioglycolic acid | TGA | 35.42 | 46.05 |
| Thiourea | TU | 15.34 | 19.03 |
| 2-mercaptoethanol | 2ME | | 39.06 |
| Thiokol liquid polymer LP-3 | LP3 | 773.03 | |
| ((Thiokol Chemical Corp.) Described as having formula $HS-(C_2H_4O-CH_2-O-C_2H_4S-S)_6-C_2H_4-O-CH_2-O-C_2H_4-SH$ having viscosity at 25° C. of 700–1,200 centipoises.) | | | |
| Thiokol liquid polymer LP-8 | LP8 | 380.68 | |
| ((Thiokol Chemical Corp.) Described as having formula $HS(CH_2CH_2-O-CH_2-O-CH_2CH_2SS)_{3-4}CH_2CH_2-O-CH_2-O-CH_2CH_2SH$ having viscosity at 27° C. of 250–350 centipoises.) | | | |
| Thiokol liquid polymer LP-33 | LP33 | 597.66 | |
| ((Thiokol Chemical Corp.) Described as having formula $HS(C_2H_4-O-CH_2-O-C_2H_4S-S)_6-C_2H_4-O-CH_2-O-C_2H_4-SH$ having viscosity at 25° C. at 1,300–1,550 centipoises.) | | | |

E. POLYESTER RESINS

| Compound | Abbrev. used in tables | Observed | Theoretical |
|---|---|---|---|
| Polyester resin [2] | PER 1 | 246.1 | |
| (A succinic acid, azelaic acid, ethylene glycol, and glycerol polyester.) | | | |
| Polyester resin [3] | PER 2 | 107.4 | |
| (A glycerol, azelaic acid and succinic anhydride polyester.) | | | |
| Polyester resin [4] | PER 3 | 929.0 | |
| (A diethylene glycol, adipic acid and glycerol polyester.) | | | |
| Polyester resin [5] | PER 4 | 480.5 | |
| (A diethylene glycol and adipic acid polyester.) | | | |
| Polyester resin [6] | PER 5 | 1,046 | |
| (A diethylene glycol and phthalic anhydride polyester.) | | | |

[2] In a 3-neck flask provided with a thermometer, a condenser attached through a water trap, and a mechanical stirrer was placed 502 parts succinic anhydride, 943 parts azelaic acid, and 414 parts ethylene glycol. The reaction mixture was gradually heated to 204° C. with continuous agitation at which point a sufficient amount of xylene was added to give constant refluxing at 195–204° C. After refluxing for 2 hours at 195–204° C., 462 parts of glycerol was added dropwise over a period of 1 hour and 10 minutes. Refluxing was continued for 2 hours and 15 minutes at 204–220° C. at which point most of the xylene was removed by distillation. The viscous syrupy product had a non-volatile content of 96.5% and an acid value of 6.

[3] As in the preparation of PER 1, 925 parts of glycerol, 785 parts azelaic acid, and 418 parts of succinic anhydride were refluxed with xylene at 184–204° C. for 3½ hours. Most of the xylene was removed by distillation at 200–205° C. The viscous syrupy product had a non-volatile content of 95% and acid value of 7.6.

[4] As in the preparation of PER 1, 212 parts of diethylene glycol, 292 parts of adipic acid, and 2 parts of glycerol were refluxed with xylene at 200–225° C. for 6 hours. The xylene was removed by heating at 220–225° C. with reduced pressure of around 70–80 mm. The viscous syrupy product had an acid value of 12.8.

[5] As in the preparation of PER 1, 212 parts of diethylene glycol and 292 parts of adipic acid were refluxed with xylene at 200–225° C. for 6 hours. The xylene was removed by heating at 200–225° C. with reduced pressure of around 70–80 mm. The viscous syrupy product had an acid value of 87.

[6] As in the preparation of PER 1, 212 parts diethylene glycol and 355 parts of phthalic anhydride were refluxed with xylene at 200–225° C. for 6 hours. The xylene was removed by heating at 220–225° C. with reduced pressure of around 70–80 mm. The viscous syrupy product had an acid value of 60.

The following examples, presented in tabular form to conserve space, illustrate the conversion of mixtures of Diphenolic Acid and polyisocyanates alone and modified with a monoisocyanate to insoluble, infusible products. Each of the acid condensates was dissolved in the designated solvent in the indicated amounts to a non-volatile content of 40–60%. The isocyanates and active hydrogen compounds were used in most examples at 100% non-volatile content. In some instances, however, the active hydrogen compound was dissolved in small amounts of the same solvent for solubility purposes before being added to the solution of the acid condensate. The mixtures obtained by adding all the ingredients together were applied to glass panels at .002″ wet film thickness. The table gives the heat treatment used for conversion. It will be understood that certain tabulated examples are superior in some respects to other examples. The purpose of the table is to give an indication of the properties possible with varying compositions. With a particular application in mind, the composition may be formulated accordingly to obtain the desired characteristics. In Table IV, Examples IX, X, XVIII, XXVII, XXIX, XXXVII, XLVI, L, LII, LVII, LXXIV, LXXV, LXXXI, XCVIII, CXI, CXIX, and CXXVIII have been found to be particularly well suited for protective coatings. All parts are by weight. Where two solvents are indicated, they were mixed in 50–50 basis by weight.

*Table IV.—Examples of the invention as a coating*

A. POLYHYDROXY COMPOUNDS

| Ex. No. | Acid condensate [3] | Parts | Isocyanate | Parts | Active compound | Parts | Triethylamine catalyst, parts | Solvent | Conversion Time (hrs.) | Conversion Temp. °C | Withstood in hrs. $H_2O$ at 100°C | Withstood in hrs. 5% aq. NaOH at 25°C |
|---|---|---|---|---|---|---|---|---|---|---|---|---|
| I | AC2 | 501 | MO HX | 103 | EG | 1,390 | | MEK [1] | 0.5 | 175 | 6 | 0.12 |
| II | AC4 | 62 | MO HX | 103 | G | 15 | | MEK | 0.5 | 175 | 16.5 | 13.5 |
| III | AC3 | 131 | MO HX | 153 | Epon 1007 | 310 | | MEK | 0.5 | 175 | 16+ | 13+ |
| IV | AC1 | 53 | MO HX | 153 | BPF | 156 | | MEK | 0.5 | 175 | 16+ | |
| V | AC5 | 56 | MO HX | 72 | DHB | 44 | | MEK | 0.5 | 175 | 16+ | 16+ |
| VI | AC5 | 67 | MO HX | 93 | DHN | 67 | | MEK | 0.5 | 175 | 16+ | 16+ |
| VII | AC5 | 67 | MO HX | 93 | DEG | 307 | | MEK | 0.5 | 175 | 13 | 3 |
| VIII | AC6 | 138 | MO HX | 93 | EG | 5.6 | | MEK | 0.5 | 175 | 1.5 | 1.5 |
| IX | AC4 | 62 | MO HX | 114 | BDF | 59 | 3.6 | MEK | 0.5 | 175 | 16+ | 10 |
| X | AC4 | 62 | MO HX | 72 | R | 21 | 3.6 | MEK | 0.5 | 175 | 16+ | 11 |
| XI | AC5 | 56 | MO TM | 538 | Budiol | 196 | 3.6 | MEK | 0.5 | 175 | 16+ | 16+ |
| XII | AC3 | 67 | MO TM | 538 | HQ | 80.5 | 3.6 | MEK | 0.5 | 175 | 1.5 | 13+ |
| XIII | AC6 | 96 | MO TM | 485 | BDM | 122 | 3.6 | MEK | 0.5 | 175 | 3.5 | 3.5 |
| XIV | AC4 | 62 | HY T | 91 | PG4000 | 826 | | MEK | 0.5 | 175 | 3.5 | .25 |
| XV | AC3 | 106 | HY T | 81 | PG4000 | 826 | 3.6 | MEK | 0.5 | 175 | 4.5 | 3.5 |
| XVI | AC3 | 106 | HY T | 81 | PG1000 | 156 | | MEK | 0.5 | 175 | 3 | 5.5 |
| XVII | AC2 | 25 | HY M | 126 | Budiol | 15.7 | | MEK | 0.5 | 175 | 16+ | 16+ |
| XVIII | AC1 | 21 | HY M | 126 | DEG | 22.4 | | MEK | 0.5 | 175 | 16+ | 16+ |
| XIX | AC1 | 76 | HY T | 91 | DEG | 26.9 | | MEK | 0.5 | 175 | 16+ | 8 |
| XX | AC1 | 21 | HY M | 98 | G | 8.9 | | MEK | 0.5 | 175 | 16+ | 8 |
| XXI | AC3 | 55 | HY M | 98 | Epon 864 | 93 | | MEK | 0.5 | 175 | 16+ | 3 |
| XXII | AC3 | 106 | HY M | 126 | DHN | 22 | | MEK | 0.5 | 175 | 16+ | 16+ |
| XXIII | AC5 | 56 | N200 | 61 | PG1000 | 41 | | MEK | 0.5 | 175 | 5 | 5 |
| XXIV | AC2 | 25 | N200 | 99 | HQ | 81 | | MEK | 0.5 | 175 | 13.5 | 1.5 |
| XXV | AC4 | 62 | N200 | 80 | Epon 1007 | 36 | | MEK | 0.5 | 175 | 16+ | 5 |
| XXVI | AC5 | 56 | MO N5 | 116 | G | 15 | | MEK | 0.5 | 175 | 16+ | 13+ |
| XXVII | AC2 | 25 | DUR | 110 | Epon 1007 | 150 | | MEK | 0.5 | 175 | 16+ | 16+ |

B. POLYBASIC ACIDS

| Ex. No. | Acid condensate | Parts | Isocyanate | Parts | Active compound | Parts | Triethylamine catalyst, parts | Solvent | Time (hrs.) | Temp. °C | $H_2O$ at 100°C | 5% aq. NaOH at 25°C |
|---|---|---|---|---|---|---|---|---|---|---|---|---|
| XXVIII | AC1 | 52 | HY T | 181 | Az | 87 | | MEK/MIK [2] | 0.5 | 175 | 16+ | 50+ |
| XXIX | AC4 | 62 | HY T | 91 | AA | 36 | 3.6 | MEK/MIK | 0.5 | 175 | 16+ | 50+ |
| XXX | AC5 | 67 | HY T | 91 | FA | 21 | 3.6 | MEK/MIK | 0.5 | 175 | 16+ | 8 |
| XXXI | AC4 | 99 | HY T | 181 | IA | 97 | 9.0 | MEK/MIK | 0.5 | 175 | 16+ | 50+ |
| XXXII | AC1 | 15 | HY M | 280 | AA | 121 | 3.6 | MEK/MIK | 0.5 | 175 | 16+ | 50+ |
| XXXIII | AC6 | 56 | HY M | 140 | Az | 43 | | MEK/MIK | 0.5 | 175 | 16+ | 50+ |
| XXXIV | AC1 | 40 | HY M | 140 | AA | 43 | 3.6 | MEK/MIK | 0.5 | 175 | 16+ | 50+ |
| XXXV | AC6 | 96 | HY M | 280 | FA | 26 | 3.6 | MEK/MIK | 0.5 | 175 | 16+ | 50+ |
| XXXVI | AC3 | 53 | HY M | 280 | DGA | 100 | | MEK/MIK | 0.5 | 175 | 16+ | 50+ |
| XXXVII | AC3 | 93 | MO HX | 103 | Az | 26 | | MEK/MIK | 0.5 | 175 | 16+ | 24+ |
| XXXVIII | AC5 | 78 | MO HX | 103 | AA | 21 | 3.6 | MEK/MIK | 0.5 | 175 | 16+ | 7.5 |
| XXXIX | AC1 | 32 | MO HX | 103 | AcA | 23 | 3.6 | MEK/MIK | 0.5 | 175 | 16+ | 50+ |
| XL | AC4 | 62 | MO HX | 206 | DGA | 83 | 3.6 | MEK/MIK | 0.5 | 175 | 4 | .16 |
| XLI | AC2 | 25 | MO TM | 538 | Az | 43 | | MEK/MIK | 0.5 | 175 | 3 | .16 |
| XLII | AC1 | 26 | MO TM | 538 | AA | 36 | 3.6 | MEK/MIK | 0.5 | 175 | 16+ | 50+ |
| XLIII | AC5 | 34 | MO TM | 538 | AcA | 40 | | MEK/MIK | 0.5 | 175 | 16+ | 7.5 |
| XLIV | AC6 | 96 | MO TM | 538 | DGA | 83 | | MEK/MIK | 0.5 | 175 | 16+ | 50+ |

C. POLYAMINES AND POLYAMIDES

| Ex. No. | Acid condensate | Parts | Isocyanate | Parts | Active compound | Parts | Triethylamine catalyst, parts | Solvent | Time (hrs.) | Temp. °C | $H_2O$ at 100°C | 5% aq. NaOH at 25°C |
|---|---|---|---|---|---|---|---|---|---|---|---|---|
| XLV | AC1 | 147 | MO HX | 310 | DET | 4 | | DMSO [4] | 0.5 | 175 | 8 | 8 |
| XLVI | AC1 | 132 | MO HX | 310 | ADA | 53 | | DMSO | 0.5 | 175 | 16+ | 16+ |
| XLVII | AC4 | 62 | MO HX | 103 | TSA | 49 | | DMSO | 0.5 | 175 | 8 | 1.5 |
| XLVIII | AC6 | 192 | MO HX | 100 | DET | 21 | | DMSO | 0.5 | 175 | 5 | 5 |
| XLIX | AC4 | 112 | MO HX | 103 | Hexa | 8 | | DMSO | 0.5 | 175 | 8 | 5 |
| L | AC5 | 56 | MO HX | 73 | TT | 0.5 | | DMSO | 0.5 | 175 | 16 | 50+ |
| LI | AC2 | 80 | MO HX | 103 | PD | 8 | | DMSO | 0.5 | 175 | 16 | .5 |
| LII | AC6 | 153 | MO HX | 103 | PD | 108 | | DMSO | 0.5 | 175 | 16 | 16 |
| LIII | AC4 | 43 | MO HX | 52 | PA | 30 | | DMSO | 0.5 | 175 | 16 | 50+ |
| LIV | AC6 | 363 | HY T | 181 | Hexa | 8 | | DMSO | 0.5 | 175 | 5 | 1.5 |
| LV | AC6 | 96 | HY T | 181 | PA | 70 | | DMSO | 0.5 | 175 | 8 | .25 |
| LVI | AC3 | 120 | HY T | 91 | PAR | 38 | | DMSO | 0.5 | 175 | 16+ | .25 |
| LVII | AC1 | 52 | HY T | 91 | DET | 21 | | DMSO | 0.5 | 175 | 16 | 8+ |
| LVIII | AC2 | 40 | HY T | 91 | TT | 6 | | DMSO | 0.5 | 175 | 8 | 50+ |
| LIX | AC2 | 35 | HY T | 82 | PD | 8 | | DMSO | 0.5 | 175 | 5 | .5 |
| LX | AC6 | 86 | HY T | 63 | Hexa | 10 | | DMSO | 0.5 | 175 | 1 | 8 |
| LXI | AC1 | 21 | HY T | 91 | PAR | 62 | | DMSO | 0.5 | 175 | 8 | .5 |
| LXII | AC2 | 35 | N200 | 133 | DET | 5 | | DMSO | 0.5 | 175 | .25 | 1.5 |
| LXIII | AC2 | 25 | HY M | 84 | DET | 1.7 | | DMSO | 0.5 | 175 | 16+ | .25 |
| LXIV | AC2 | 50 | HY M | 140 | TSA | 49 | | DMSO | 0.5 | 175 | 16 | 5 |
| LXV | AC5 | 78 | HY M | 140 | PAR | 84 | | DMSO | 0.5 | 175 | 16+ | 16 |
| LXVI | AC3 | 40 | HY M | 126 | DET | 8 | | DMSO | 0.5 | 175 | 16+ | 10 |
| LXVII | AC1 | 46 | HY M | 139 | PD | 8 | | DMSO | 0.5 | 175 | 16 | 50+ |
| LXVIII | AC6 | 57 | MO TM | 108 | TSA | 69 | | DMSO | 0.5 | 175 | 16+ | .25 |
| LXIX | AC2 | 45 | MO TM | 108 | TT | 2.8 | | DMSO | 0.5 | 175 | 8 | 8 |
| LXX | AC4 | 87 | MO TM | 97 | PD | 97 | | DMSO | 0.5 | 175 | 16 | .25 |
| LXXI | AC5 | 62 | MO TM | 97 | ADA | 100 | | DMSO | 0.5 | 175 | 5 | .25 |
| LXXII | AC3 | 6 | MO TM | 97 | PA | 16 | | DMSO | 0.5 | 175 | 5 | .25 |

*Table IV.—Examples of the invention as a coating*—Continued

D. SULFUR-CONTAINING COMPOUNDS

| Ex. No. | Acid condensate [3] | Parts | Isocyanate | Parts | Active compound | Parts | Triethylamine catalyst, parts | Solvent | Conversion Time (hrs.) | Conversion Temp., °C. | Withstood in hrs. $H_2O$ at 100° C. | Withstood in hrs. 5% aq. NaOH at 25° C. |
|---|---|---|---|---|---|---|---|---|---|---|---|---|
| LXXIII | AC1 | 79 | MO HX | 518 | TA | 28 | | | 0.5 | 175 | 16+ | 50+ |
| LXXIV | AC3 | 133 | MO HX | 206 | 2ME | 78 | | | 0.5 | 175 | 16+ | 24 |
| LXXV | AC3 | 67 | MO HX | 114 | TU | 38 | | | 0.5 | 175 | 8 | 24 |
| LXXVI | AC2 | 25 | MO HX | 102 | TU | 39 | | | 0.5 | 175 | 16+ | .08 |
| LXXVII | AC6 | 57 | HY T | 181 | 2ME | 39 | | | 0.5 | 175 | 16+ | .08 |
| LXXVIII | AC4 | 62 | HY T | 117 | LP8 | 304 | | | 0.5 | 175 | .08 | 24 |
| LXXIX | AC4 | 18 | MO TM | 28 | LP33 | 37 | | | 0.5 | 175 | 6 | .08 |
| LXXX | AC3 | 65 | MO TM | 65 | LP33 | 323 | | | 0.5 | 175 | 16+ | 50+ |
| LXXXI | AC5 | 56 | MO TM | 538 | 2ME | 39 | | | 0.5 | 175 | 16+ | 50+ |
| LXXXII | AC4 | 124 | HY M | 279 | TU | 76 | | | 0.5 | 175 | 3.5 | 24 |
| LXXXIII | AC6 | 96 | HY M | 73 | LP3 | 15 | | | 0.5 | 175 | 16+ | .08 |
| LXXXIV | AC2 | 26 | HY M | 126 | LP33 | 243 | | | 0.5 | 175 | 16+ | 50+ |
| LXXXV | AC4 | 62 | HY M | 140 | TGA | 18 | | | 0.5 | 175 | 6 | .08 |
| LXXXVI | AC6 | 96 | HY M | 154 | TA | 35 | | | 0.5 | 175 | 16+ | 50+ |
| LXXXVII | AC1 | 52 | HY M | 182 | TGA | 28 | | | 0.5 | 175 | 16+ | .08 |
| LXXXVIII | AC4 | 62 | HY M | 84 | LP33 | 60 | | | 0.5 | 175 | 16+ | 2.5 |
| LXXXIX | AC5 | 112 | N200 | 133 | LP3 | 773 | | | 0.5 | 175 | .08 | 2.5 |
| XC | AC6 | 96 | MO N5 | 116 | LP8 | 190 | | | 0.5 | 175 | 16+ | 50+ |
| XCI | AC6 | 57 | MO HX | 93 | TGA | 21 | | | 0.5 | 175 | .08 | 50+ |

E. POLYESTER RESINS

| Ex. No. | Acid condensate | Parts Fused [5] | Parts Unfused | Isocyanate | Parts | Active compound | Parts | Triethylamine catalyst, parts | Solvent | Conversion Time (hrs.) | Conversion Temp., °C. | Withstood in hrs. $H_2O$ at 100° C. | Withstood in hrs. 5% aq. NaOH at 25° C. |
|---|---|---|---|---|---|---|---|---|---|---|---|---|---|
| XCII | AC4 | 61 | | MO HX | 103 | PER 1 | 123 | | MIK | 0.5 | 175 | 13 | 0.08+ |
| XCIII | AC3 | [6] 13 | | HY M | 280 | PER 5 | 105 | | Dioxane | 0.5 | 175 | 17+ | .25 |
| XCIV | AC2 | 26 | 152 | HY T | 435 | PER 4 | 240 | | MIK/MEK | 0.5 | 175 | 17+ | .25 |
| XCV | AC3 | [6] 13 | 80 | HY M | 140 | PER 5 | 105 | | Diox/MEK | 0.5 | 175 | 17+ | 7.5 |
| XCVI | AC5 | 56 | | HY T | 91 | PER 2 | 62 | | MIK | 0.5 | 175 | 17+ | 9 |
| XCVII | AC6 | 48 | | HY M | 70 | PER 1 | 61 | | MIK | 0.5 | 175 | 17+ | 80+ |
| XCVIII | AC4 | 61 | 61 | MO HX | 155 | PER 1 | 123 | | Diox/MEK | 0.5 | 175 | 17+ | .08+ |
| XCIX | AC6 | | 191 | MO HX | 124 | PER 1 | 49 | | MEK/MIK | 0.5 | 175 | 17+ | 1 |
| C | AC1 | 5 | 68 | HY T | 136 | PER 3 | 93 | | MEK/MIK | 0.5 | 175 | 17+ | 2 |
| CI | AC6 | | 191 | MO HX | 114 | PER 1 | 24 | | MEK | 0.5 | 175 | 5 | .25 |
| CII | AC1 | 5 | | HY T | 18 | PER 3 | 93 | | MIK | 0.5 | 175 | .5 | .25 |
| CIII | AC1 | | 105 | HY T | 184 | PER 3 | 28 | | MIK/MEK | 0.5 | 175 | 17+ | 2 |
| CIV | AC5 | | 112 | N200 | 139 | PER 4 | 24 | | MIK/MEK | 0.5 | 175 | 17+ | .5 |
| CV | AC4 | | 124 | MO TM | 555 | PER 5 | 31 | | MIK/MEK | 0.5 | 175 | 17+ | 7.5 |
| CVI | AC1 | | 105 | HY T | 187 | PER 3 | 56 | | MIK/MEK | 0.5 | 175 | 17+ | 1 |
| CVII | AC1 | | 105 | MO HX | 248 | PER 2 | 50 | | MIK/MEK | 0.5 | 175 | 17+ | 7.5 |
| CVIII | AC1 | | 105 | MO HX | 213 | PER 3 | 56 | | MIK/MEK | 0.5 | 175 | 10 | .08 |
| CIX | AC1 | | 105 | HY T | 191 | PER 3 | 111 | | MIK/MEK | 0.5 | 175 | 17+ | 2 |
| CX | AC3 | | 133 | HY M | 182 | PER 4 | 144 | | MIK/MEK | 0.5 | 175 | 17+ | 80 |
| CXI | AC2 | | 100 | MO TM | 1,132 | PER 5 | 105 | | Diox/MEK | 0.5 | 175 | 17+ | 2 |
| CXII | AC1 | | 105 | N200 | 319 | PER 1 | 98 | | MIK/MEK | 0.5 | 175 | 17+ | 80 |
| CXIII | AC2 | | 100 | Dur | 270 | PER 1 | 98 | | MEK/Benz | 0.5 | 175 | 17+ | 2 |
| CXIV | AC5 | 62 | | MO TM | 538 | PER 1 | 122 | | MIK | 0.5 | 175 | 17+ | 80+ |
| CXV | AC6 | | 96 | MO N5 | 98 | PER 1 | 98 | | MIK/MEK | 0.5 | 175 | 17+ | .16 |
| CXVI | AC3 | | 133 | N200 | 266 | PER 2 | 124 | | MIK/MEK | 0.5 | 175 | 17+ | 5 |
| CXVII | AC1 | | 53 | N200 | 186 | PER 1 | 98 | | MIK/MEK | 0.5 | 175 | 17+ | 80+ |
| CXVIII | AC1 | | 53 | N200 | 186 | PER 1 | 146 | | MIK/MEK | 0.5 | 175 | 17+ | 80+ |
| CXIX | AC4 | | 124 | HY T | 101 | PER 3 | 111 | | MIK/MEK | 0.5 | 175 | 17+ | .08 |
| CXX | AC6 | | 96 | HY M | 87 | PER 3 | 111 | | MIK/MEK | 0.5 | 175 | 17+ | .08 |
| CXXI | AC6 | | 96 | HY T | 63 | PER 4 | 96 | 3.6 | MIK/MEK | 1.0 | 175 | 17+ | 41 |
| CXXII | AC2 | | 65 | N200 | 199 | PER 3 | 186 | | MIK/MEK | 0.5 | 175 | .5 | 2 |
| CXXIII | AC4 | | 124 | MO HX | 238 | PER 4 | 62 | | MIK/MEK | 0.5 | 175 | 17+ | .08 |
| CXXIV | AC2 | | 125 | HY T | 317 | PER 2 | 124 | | MIK/MEK | 0.5 | 175 | 17+ | 2 |
| CXXV | AC4 | | 99 | MO HX | 88 | PER 5 | 52 | | MEK/Diox | 0.5 | 175 | 17+ | .25 |
| CXXVI | AC4 | | 99 | MO HX | 176 | PER 5 | 52 | | MIK/MEK | 0.5 | 175 | 17+ | 7.5 |
| CXXVII | AC6 | | 191 | MO HX | 186 | PER 2 | 99 | | MIK/MEK | 0.5 | 175 | 17+ | 32 |
| CXXVIII | AC2 | | 50 | MO N5 | 140 | PER 4 | 96 | | MIK/MEK | 0.5 | 175 | 2 | .08 |
| CXXIX | AC6 | | 57 | Dur | 44 | PER 5 | 105 | | MEK/Diox, MIK/Benz | 0.5 | 175 | .5 | 80+ |
| CXXX | AC1 | | 105 | MO HX, MO P | 104, 128 | PER 3 | 28 | | MEK/MIK | 0.5 | 175 | 17+ | 2 |

[1] MEK is abbreviation for methyl ethyl ketone.
[2] MIK is abbreviation for methyl isobutyl ketone.
[3] All acid condensates dissolved in 50% MEK.
[4] DMSO is abbreviation for Dimethyl Sulfoxide.
[5] Except as noted in footnote 6, this amount of condensate was fused with the active compound on a 1:1 equivalent weight basis and dissolved in methyl ethyl ketone to a non-volatile content of 50% before use.
[6] This amount of condensate was fused with the active compound on a 1:1 equivalent weight basis and dissolved in dioxane to a non-volatile content of 50% before use.

In order to demonstrate preparation of foam resin structures in accordance with the invention, the following examples were prepared:

*Example CXXXI.*—268 parts of the acid condensate AC 1 and 1220 parts of the active compound PER 1 were heated to obtain a molten mixture, after which 74 parts of polyoxyethylene sorbitan mono-oleate, an emulsifier sold under the trade-name Tween 80 by Atlas Powder Company, and 3.6 parts of triethylamine were added with stirring to form a homogeneous mixture. 906 parts of toluene-2,4-diisocyanate were admixed and the reaction allowed to proceed without further heating until the product had reached an insoluble infusible state. The result was a yellow, hard, rigid, tough foam having an irregular cell structure.

*Example CXXXII.*—Example CXXXI was repeated except that 251 parts of the acid condensate AC 2 were substituted. No appreciable change from the product of Example CXXXI was observed.

*Example CXXXIII.*—Example CXXXI was repeated except that the amount of the acid condensate was increased to 421 parts, the amount of PER 1 was decreased to 488 parts, the amount of emulsifier was decreased to 45 parts and the triethylamine was omitted entirely. The result foam was similar to that of Example CXXXI except that it displayed a tendency toward brittleness.

*Example CXXXIV.*—Example CXXXI was repeated except that the amount of isocyanate was decreased to 544 parts, the amount of emulsifier decreased to 60 parts and 921 parts of the polyester active hydrogen compound PER 3 was substituted for that of Example CXXXI. Very little difference in the product was noticed as it was still an irregular yellow foam that was rigid, hard and tough.

*Example CXXXV.*—Example CXXXIV was repeated except that the amount of the acid condensate was increased to 788 parts, the amount of the isocyanate to 1431 parts, the amount of the emulsifier to 76 parts while the amount of PER 3 was decreased to 743 parts. The product was substantially similar to that resulting in Example CXXXIV except for a tendency toward brittleness.

*Example CXXXVI.*—Example CXXXI was repeated except that 620 parts of the acid condensate AC 4 were substituted, the amount of PER 1 decreased to 930 parts and the amount of emulsifier increased slightly to 78 parts. These changes did not cause a significant change in the properties of the foam other than adding a slight tendency toward brittleness.

*Example CXXXVII.*—Example CXXXI was repeated except for the omission of the triethylamine. The product was not observably different from that of Example CXXXI.

The aforegoing examples, both as to films and foams, are furnished only for the guidance of those seeking to practice the invention and not for the purpose of defining the boundaries in which it is operative. The numerous other embodiments are possible and will be suggested by these relatively few illustrations.

Although the examples describe the preparation of products in which the reaction is allowed to proceed to the point where the product is infusible and insoluble, it will be appreciated that the reaction could be terminated short of this point to yield intermediate products. For certain applications, it may be desirable to carry the reaction to an intermediate stage and effect the final cure by exposure either to room temperature for a long period of time or to a further heat treatment. It will also be understood that although the examples in the tables were converted to the insoluble, infusible state by means of heat, this was done largely in the interest of saving time and the same result can ordinarily be obtained at room temperature for much longer periods of time.

It is contemplated by the invention that various inactive ingredients, such as fillers, pigments and plasticizers can be added to the reaction mixture to modify the product in known ways. For example, the admixture of a pigment would be suggested where the product was to be used as a decorative coating as a replacement for paint. Inert fillers, such as siliceous and metallic powders might be added where the specific application demands a product having unusual structural strength or resistance to heat.

It is claimed and desired to secure by Letters Patent:

1. A composition of matter comprising the reaction product of (A) an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur and (C) a resinous polycarboxylic acid which is the condensation product of (a) formaldehyde and (b) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, with said hydroxyphenyl radical having hydrogen on at least one position ortho to the hydroxyl, wherein the ratio of (a) to (b) is from 1–4 moles of (a) per mole of (b); wherein (A) and (B)+(C) are present on an equivalent ratio of from about 5:1 to 1:5 with (B) constituting from 5–65% of (B)+(C).

2. The composition of matter of claim 1 where the pentanoic acid of (C–b) consists essentially of 4,4 bis(4-hydroxyaryl)pentanoic acid wherein the hydroxyaryl radical is a hydroxyphenyl radical and is free from substituents other than alkyl groups of one carbon atom.

3. The composition of matter of claim 1 wherein the pentanoic acid of (C–b) is 4,4 bis(4-hydroxyphenyl)pentanoic acid.

4. The composition of matter of claim 3 wherein (A) and (B)+(C) are present on an equivalent ratio or from about 2:1 to 1:2 with (B) constituting from 5–65% of (B)+(C).

5. The composition of matter as described in claim 4 wherein (A) is an aromatic polyisocyanate.

6. The composition of matter as described in claim 4 wherein (A) is an aliphatic polyisocyanate.

7. The composition of matter comprising the reaction product of (A) a mixture of organic monoisocyanates and polyisocyanates wherein at least 50% of the mixture is a polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur and (C) a resinous polycarboxylic acid which is the condensation product of (a) formaldehyde and (b) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms with said hydroxyphenyl radical having hydrogen on at least one position ortho to the hydroxyl, wherein the ratio of (a) to (b) is from 1–4 moles of (a) per mole of (b); wherein (A) and (B)+(C) are present on an equivalent ratio of from about 5:1 to 1:5 with (B) constituting from 5–65% of (B)+(C).

8. A composition of matter comprising the cellular reaction product of (A) an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur, (C) a resinous polycarboxylic acid which is the condensation product of (a) formaldehyde and (b) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms with said hydroxyphenyl radical having hydrogen on at least one position ortho to the hydroxyl, wherein the ratio of (a) to (b) is from 1–4 moles of (a) per mole of (b); wherein (A) and (B)+(C) are present on an equivalent ratio of from about 5:1 to 1:5 with (B) constituting from 5–65% of (B)+(C), and (D) up to about 5% of (A), (B) and (C) of water.

9. A method of preparing a new composition of matter which comprises admixing (A) an organic polyisocyanate, (B) an organic compound containing at least two active hydrogen atoms, each of said active hydrogen atoms being present in a compound selected from the group consisting of polyesters which are the reaction products of polyhydric alcohols and polycarboxylic acids, polyhydric alcohols, polyhydric phenols, polyamines, polyamides, polycarboxylic acids, mixtures thereof and any of the above compounds in which at least one oxygen atom has been replaced by sulfur and (C) a resinous polycarboxylic acid which is the condensation product of (a) formaldehyde and (b) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms with said hydroxyphenyl radical having hydrogen on at least one position ortho to the hydroxyl, wherein the ratio of (a) to (b) is from 1–4 moles of (a) per mole of (b); wherein (A) and (B)+(C) are present on an equivalent ratio of from about 5:1 to 1:5 with (B) constituting from 5–65% of (B)+(C), and heat converting said mixture to an insoluble, infusible resin.

References Cited in the file of this patent

Bader et al.: Journal of American Chemical Society, volume 76, pages 4465–4466.

UNITED STATES PATENT OFFICE

CERTIFICATE OF CORRECTION

Patent No. 2,907,719                                                                   October 6, 1959

Sylvan O. Greenlee

It is hereby certified that error appears in the printed specification of the above numbered patent requiring correction and that the said Letters Patent should read as corrected below.

Column 3, line 5, for "diphenolic acids" read -- Diphenolic Acid --; column 5, line 13, for "ad" read -- and --; column 5, line 31, for "diphenolic acids" read -- Diphenolic Acid --; column 11, Table I, second column thereof, first line of Example No. 1, for "diphenolic acid" read -- Diphenolic Acid --; same column 11, Table I, second column thereof, last line of Example No. 2, for "amount" read -- amounted --; same column 11, Table I, second column thereof, first line of Example No. 3, for "DAP" read -- DPA --; column 12, Table I, second column thereof, first lines of Examples No. 5 and 6, for "diphenolic acid", each occurrence, read -- Diphenolic Acid --; same column 12, Table I, second column thereof, line 10 of Example No. 6, for "tha" read -- the --; columns 13 and 14, Table II, first column thereof, first line, for "E. I. du Pont de Nemours & Co., Inc." read -- E. I. du Pont de Nemours & Co., Inc.; Hylene T; Hy T --; same columns 13 and 14, Table II, first column thereof, last line, for "Durenedissocyanate" read -- Durenediisocyanate --; columns 21 and 22, Table IV-D, heading to second column thereof, for "Acid condensate³" read -- Acid condensate --; same columns 21 and 22, footnote 3 of Table IV should appear as shown below instead of as in the patent:

³All acid condensates dissolved in 50% MEK in Examples XLV-LXXII.

column 24, line 21, for "or from" read -- of from --.

Signed and sealed this 8th day of November 1960.

(SEAL)
Attest:

KARL H. AXLINE                                          ROBERT C. WATSON
Attesting Officer                                    Commissioner of Patents